United States Patent [19]

Maurer

[11] Patent Number: 5,338,450

[45] Date of Patent: Aug. 16, 1994

[54] SPIRAL-WOUND ADSORBER MODULE

[75] Inventor: Richard T. Maurer, Nanuet, N.Y.

[73] Assignee: UOP, Des Plaines, Ill.

[21] Appl. No.: 82,698

[22] Filed: Jun. 28, 1993

[51] Int. Cl.5 .................. B01D 29/07; B01D 53/14
[52] U.S. Cl. ........................... 210/286; 210/304;
  210/321.74; 210/321.83; 210/493.4; 210/502.1;
  55/520; 96/152
[58] Field of Search ............... 55/498, 520; 95/141,
  95/143, 210, 211, 237; 96/152, 154; 210/321.74,
  321.83, 493.4, 497.1, 502.1, 304, 512.1, 263, 266,
  283, 284, 285, 286

[56] References Cited

U.S. PATENT DOCUMENTS

| | | | |
|---|---|---|---|
| 2,517,525 | 8/1950 | Cummings | 23/288 |
| 2,989,383 | 6/1961 | Miller | 96/152 |
| 3,800,515 | 4/1974 | Asker et al. | 96/154 |
| 4,391,616 | 7/1983 | Imamura | 96/154 |
| 4,402,717 | 9/1983 | Izumo et al. | 55/388 |
| 4,938,869 | 7/1990 | Bayerlein et al. | 210/497.1 |
| 5,149,340 | 9/1992 | Waycuilis | 55/16 |
| 5,154,832 | 10/1992 | Yamamura et al. | 210/640 |
| 5,163,291 | 11/1992 | Hitachi et al. | 600/299 |

FOREIGN PATENT DOCUMENTS 0380419  8/1990  European Pat. Off. .

Primary Examiner—Robert A. Dawson
Assistant Examiner—W. L. Walker
Attorney, Agent, or Firm—Thomas K. McBride; John G. Tolomei; Richard P. Silverman

[57] ABSTRACT

A spiral-wound adsorber module is claimed for the removal of VOCs from fluid streams. The apparatus comprises a spirally adsorbent bed supported within a cylinder to provide a compact, longer adsorbent life alternative for a thermal swing adsorption process.

14 Claims, 5 Drawing Sheets

SPIRAL-WOUND ADSORBER MODULE

FIELD OF THE INVENTION

This invention relates to an apparatus for removing volatile organic compounds (VOCs) from a fluid stream. More particularly, this invention relates to the use of an adsorbent bed in a spiral configuration to remove VOCs and water from a fluid stream in a thermal swing adsorption (TSA) process.

BACKGROUND OF THE INVENTION

The removal of a sorbable component from a gas or vapor stream by flowing such stream through a body of adsorbent material is a fundamental engineering practice. One type of sorbable components which are desirable to remove from a gas stream is volatile organic compounds VOCs.

VOCs are formed in large quantities but at relatively low concentrations from gas turbines, cogeneration plants, petrochemical plants, and in many industrial processes where waste gases contain such materials as vapors of various solvents, inks, paints, and so forth, VOCs contain not only hydrocarbons—saturated, unsaturated, and aromatic—but also contain oxygenated materials such as alcohols, esters, ethers, and acids, nitrogen containing compounds (principally amines), sulfur containing materials (mercaptans and thioethers) and halogen-containing materials, especially chlorine-substituted hydrocarbons but also organic fluorides and bromides. The presence of these VOCs in the gas stream can present a health risk or cause the gas stream to have an unpleasant odor.

The widespread use of solvents in industrial applications has resulted in increased emissions of VOCs into the atmosphere, giving rise to environmental concerns and prompting stricter legislative controls on such emissions. As a consequence, manufacturers of pharmaceuticals, coated products, textiles, and polymer composites and foams, as well as hydrocarbon producers and distributors, face a dilemma in removing VOCs from process gas streams in that, owing to rising energy prices, recovery costs are very often higher than the value of the VOCs recovered, even in light of rising solvent prices. This dilemma has led to inquiries into more profitable methods of removing condensable organic vapors from process gas streams.

Conventional adsorption systems for solvent recovery from humid air typically are operated until the solvent concentration in the outlet gas stream reaches a detectable preset breakthrough level whereupon the gas flow to the adsorber is stopped. The adsorbent bed then contains solvent, other condensable organic contaminants, and some amount of water which depends on the inlet relative humidity of the solvent laden gas stream. At this point, present-day techniques involve the introduction of steam, either saturated or superheated, which displaces the solvent from the adsorbent to produce a solvent/water mixture upon condensation. Typically two adsorber beds are used, where one is adsorbing while the other bed undergoes regeneration. More recent technology for regenerating and recovering solvent from adsorbent beds involves the use of inert gases (through for some solvents, air also can be used) and low temperature condensation of the solvent from the regenerating gas.

Of those techniques for removing VOCs from a gas stream by adsorption, the most common method is exemplified in U.S. Pat. No. 4,402,717 to Izumo et al. In Izumo et al., an apparatus for removing moisture and odors from a gas stream comprises a cylindrical honeycomb structure made from corrugated paper, uniformly coated with an adsorbent and formed in the shape of a disk or wheel. The multiplicity of adsorbent-coated parallel flow passages formed by the corrugations in the paper serve as gas passage ways which are separated as a zone for the removal of water and odor causing components in the gas, and as a zone for the regeneration of the adsorbent. The zones for removal and regeneration are continuously shiftable as the wheel is rotated circumferentially about its centerline.

The coated wheel units suffer many disadvantages. They require a large physical space to accommodate the enclosure for the wheel having the multiple removal and regeneration zones, and the associated gas transfer equipment (fans and blowers). The adsorbent-coated paper has limited range of humidity and temperature within which it can maintain its structural integrity. This failure also limits the regeneration medium to dry, moderate temperature gases and air. The contact between the adsorbent and the gas stream and hence the adsorbent capacity for the VOCs is limited to the very thin layers of adsorbent on the surface of the paper. This feature also limits the ultimate life of the adsorbent wheel, resulting in frequent wheel replacement. A further problem of the wheel system often occurs in treating fluids containing VOCs which can permanently poison the surface of the adsorbent either by blocking the pores as with compounds such as paint pigments, or by the inability of the desorption step to remove those poisons.

An adsorber module is sought which does not have the size limitations of the adsorbent wheel and has an increased adsorbent capacity for the removal of VOCs from gas streams.

It is a further object of this invention to provide an adsorbent module which has improved structural integrity which permits the use of saturated or superheated steam to regenerate the adsorbent and recover VOCs.

It is a still further object of this invention to provide an adsorbent module which is mechanically simpler to operate and is less costly to construct and operate.

SUMMARY OF THE INVENTION

The present invention is directed to a spiral-wound adsorber apparatus comprising a layer of adsorbent extending along a longitudinal axis. The layer of adsorbent having a thickness is wrapped in a spiral about the longitudinal axis. An inlet screen and an outlet screen on opposite sides of the layer of adsorbent retain the adsorbent in the spiral. The screens permit supplying and withdrawing a fluid from opposite sides of the adsorbent bed through the inlet screen and the outlet screen. At least one impermeable wall is wrapped between the inlet and the outlet screen. An impermeable wall defines an inlet channel between the impermeable wall and the inlet screen to distribute fluid to the inlet screen and to define an outlet channel between the impermeable wall and the outlet screen. An inlet conduit is in fluid communication with the inlet channel for supplying the fluid to the inlet channel. An outlet conduit is in fluid communication with the outlet channel for withdrawing fluid from the outlet channel. A means for retaining and structurally supporting the inlet screen and the outlet screen is provided at opposite transverse ends of the layer of adsorbent.

In other embodiments a plurality of spacers are located in the inlet and outlet channels to separate the impermeable wall from the inlet and/or outlet screen. The impermeable wall between the inlet and outlet screens may be a single impermeable wall wrapped between the inlet and outlet screens thus forming the inlet and outlet channels on opposite sides of the single impermeable wall. Furthermore, the spiral-wound adsorber module can be enclosed in a casing. The casing can comprise a cylinder wherein the ends of the cylinder provide the means for retaining and structurally supporting the layer of adsorbent.

To overcome the problems of poor flow distribution within the cylinder, it has been discovered that the ratio of the width of the inlet channel to the width of the outlet channel should be less than about 1. In fact, it is preferred that the ratio of the inlet channel to the outlet channel be between about 0.2 and about 0.8, and more preferably that the ratio of inlet to outlet channel width be between about 0.4 and about 0.6.

In a further embodiment, to improve the distribution of the fluid across the adsorbent bed, plurality of separators comprising fins and/or baffles may be disposed within inlet and outlet channels.

DETAILED DESCRIPTION OF THE INVENTION

Figure 1:
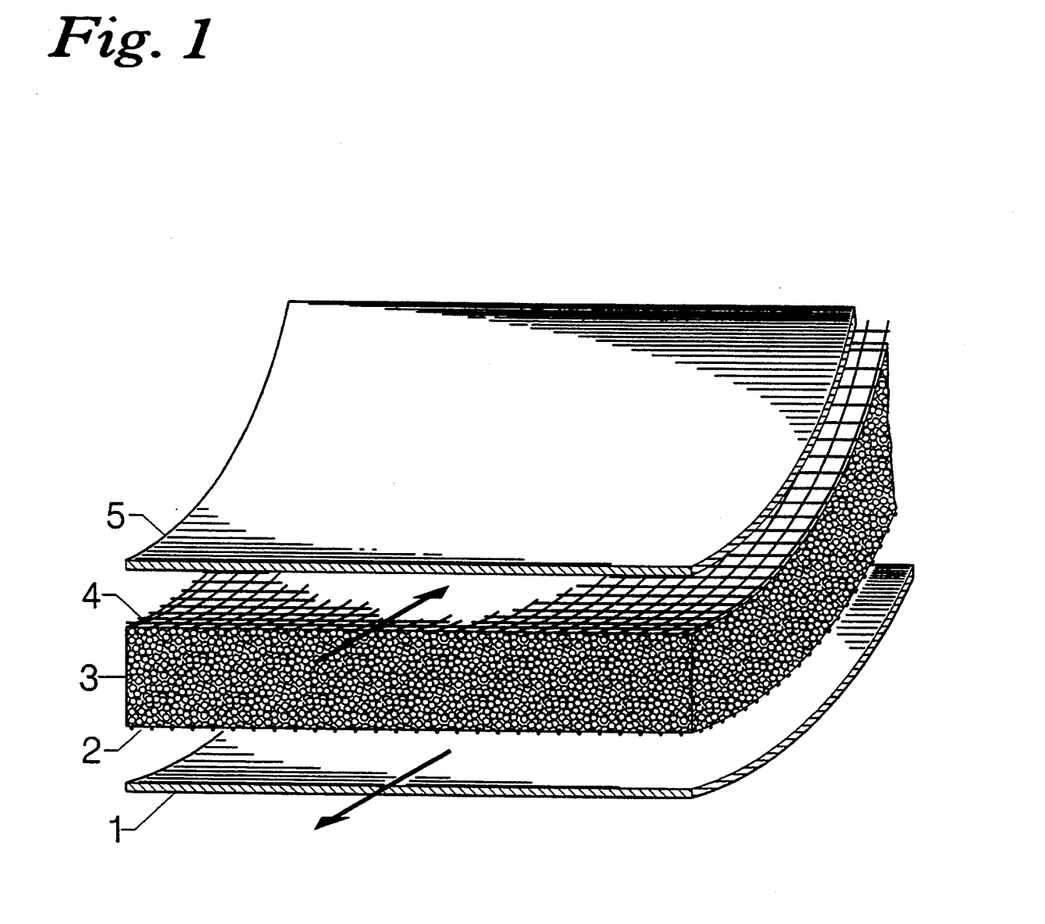
FIG. 1 is a perspective view of adsorbent bed and channel configuration in a spiral wound adsorber module.

FIG. 1 illustrates a portion of the spiral wound adsorber module to highlight the adsorbent bed and channel configuration embodying the present invention. An adsorbent bed (3) is contained by an inlet screen (4) which separates the adsorbent from the inlet channel defined by a space between the inlet screen and an inlet wall (5). The fluid enters the spiral-wound adsorber module, in a manner hereinafter described through the inlet channel. The fluid passes through the inlet screen and adsorbent bed, and the adsorbent effluent passes into an outlet channel defined by the space between an outlet screen (2) and an outlet wall (1). Typically, in the preferred embodiment, the flow of the fluid in the outlet channel is countercurrent to the flow of the fluid in the inlet channel, for example, wherein the fluid enters the module at a point on the outside of the spiral and the adsorber effluent exits adjacent to the point or the outside of the spiral. In some applications for VOC removal whenever a very low pressure drop is required, a cocurrent flow pattern in which the fluid enters the inlet channel is directed toward the center of the spiral module through the adsorbent bed to an outlet conduit in the center of the spiral.

Figure 2:
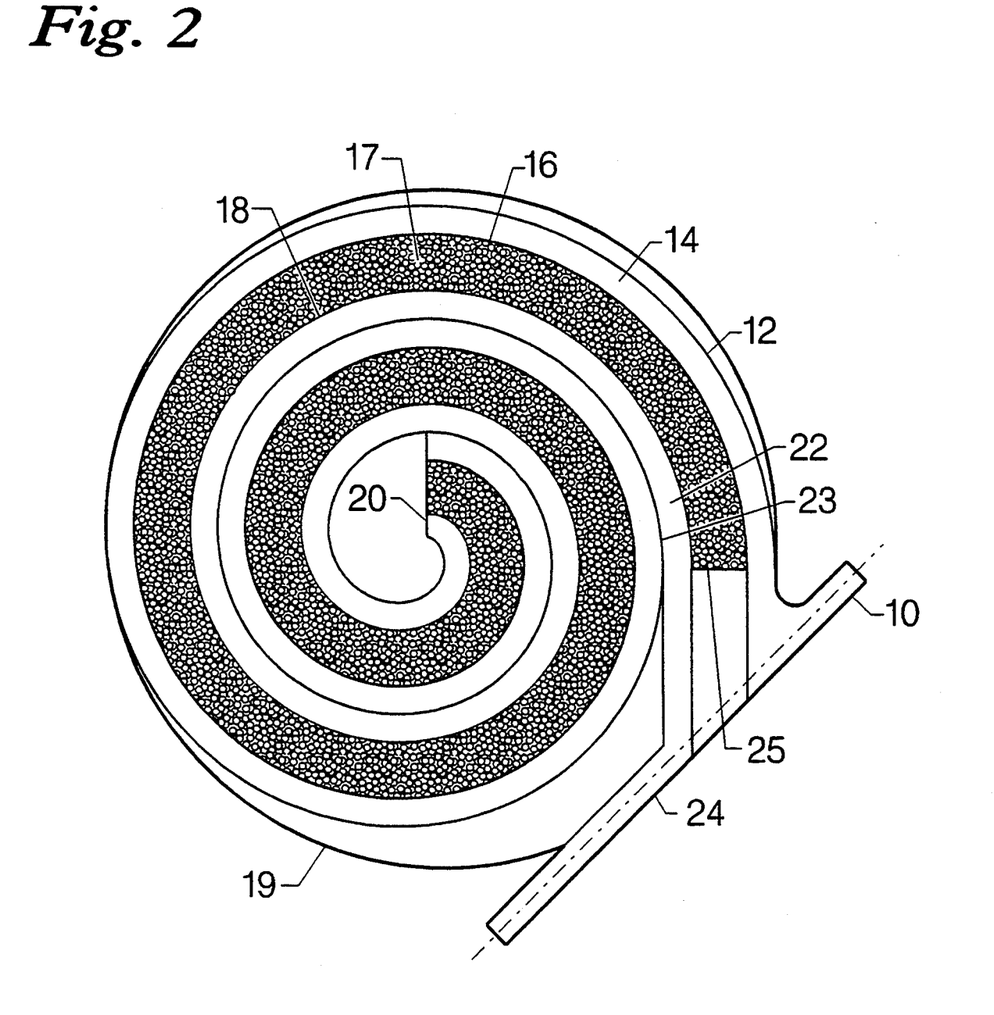
FIG. 2 is an end view of the adsorbent bed of the spiral-wound adsorber module.

FIG. 2 illustrates an end view of a spiral-wound adsorber module of the present invention. The apparatus comprises a spirally-wound adsorbent bed (17) containing an adsorbent. The longitudinally extended sides of the adsorbent bed are delineated by an inner screen (18) and an outer screen (16). The adsorbent bed has an inner end (20) and an outer end (25) which are sealed to prevent fluid flow therefrom.

The inner screen and an inner wall (23) uniformly offset from the inner screen and the inner wall comprising an impermeable material defines an inlet channel (22). Outer screen (16) and uniformly offset outer wall (12) define an outlet channel (14). A plurality of baffles or spacers (not shown) that maintain the uniform offset from the screens and the walls is typically radially disposed within the inlet and outlet channels to support the inlet and outlet screens and improve the distribution of fluid through the inlet and outlet channels. An inlet conduit (24), in fluid communication with the inlet channel (22), is rigidly mounted to the inner wall (23) and the outer end (25) of the spiral-wound module and is aligned parallel to a longitudinally extending axis. An outlet conduit (10) in fluid communication with the outlet channel (14) is rigidly mounted to the outer wall (12) and the outer end (25) of the spiral-wound module and aligned parallel to the longitudinally extending axis. The spiral-wound module is normally disposed in a casing. The casing (19), typically cylindrical, having opposite transverse ends, encloses the spiral-wound module and is fixed to the inlet and outlet conduits, and is aligned parallel to the longitudinally extending axis. The opposite transverse ends of the casing retain the adsorbent and structurally support the inlet and outlet screens. The adsorbent bed maybe supported in the spiral-wound form by fixing the inner and outer screens and inner and outer walls to the opposing transverse ends of the casing. The spacers or baffles in the inlet and outlet channels may be fixed to the walls and screens by any joining, welding or other fastening means well-known to those skilled in the art. A discussion of some metal fastening means may be found in U.S. Pat. No. 5,163,291 for a metal-made carrier body for carrying exhaust gas catalyst.

Figure 3:
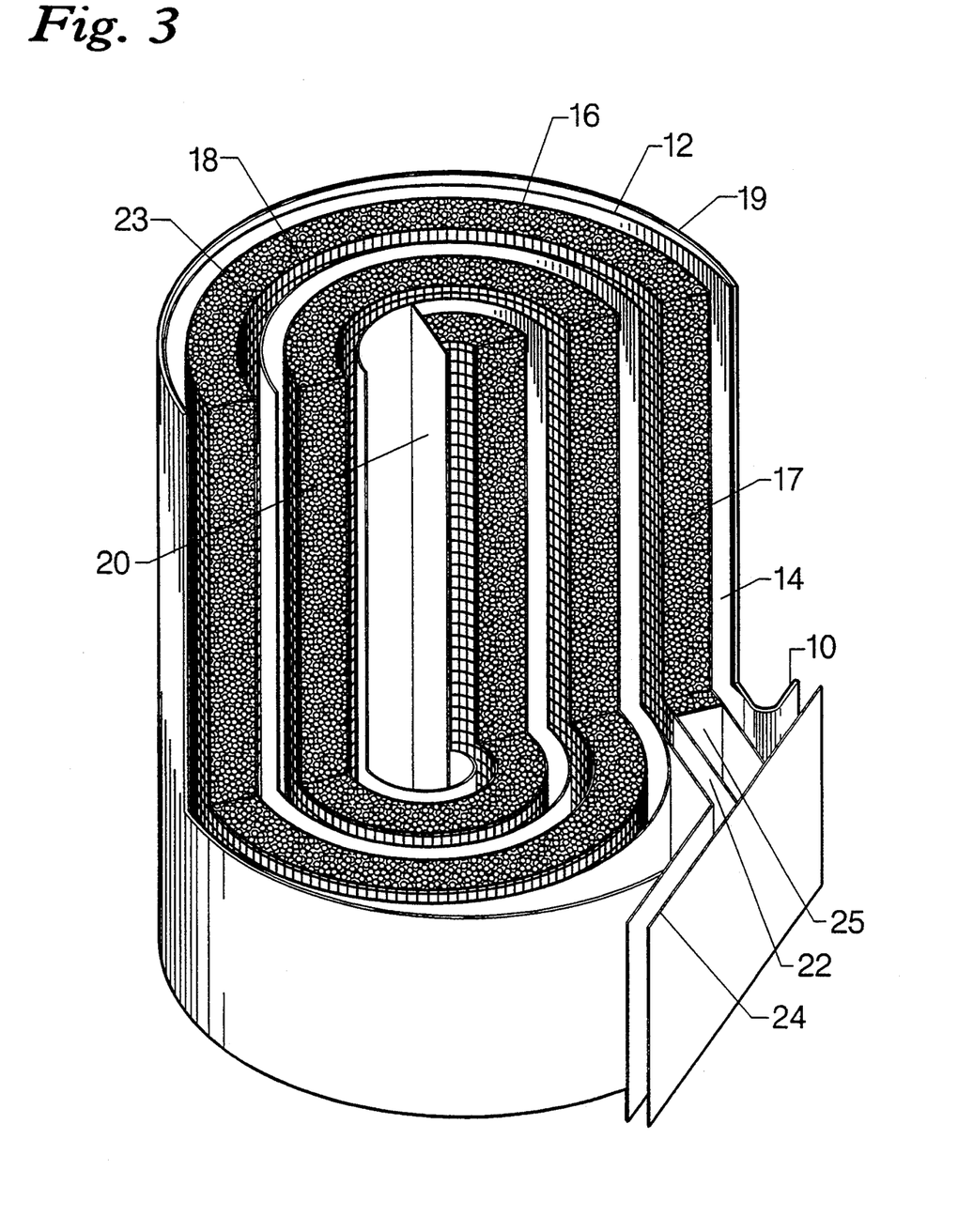
FIG. 3 is a perspective view of one embodiment of the spiral-wound adsorber module at one of the opposed transverse ends.

FIG. 3 illustrates a perspective view of a section of the spiral-would adsorber, highlighting the alignment of the inlet (24) and outlet (10) conduits with the inlet (22) and outlet (14) channels.

Figure 4:
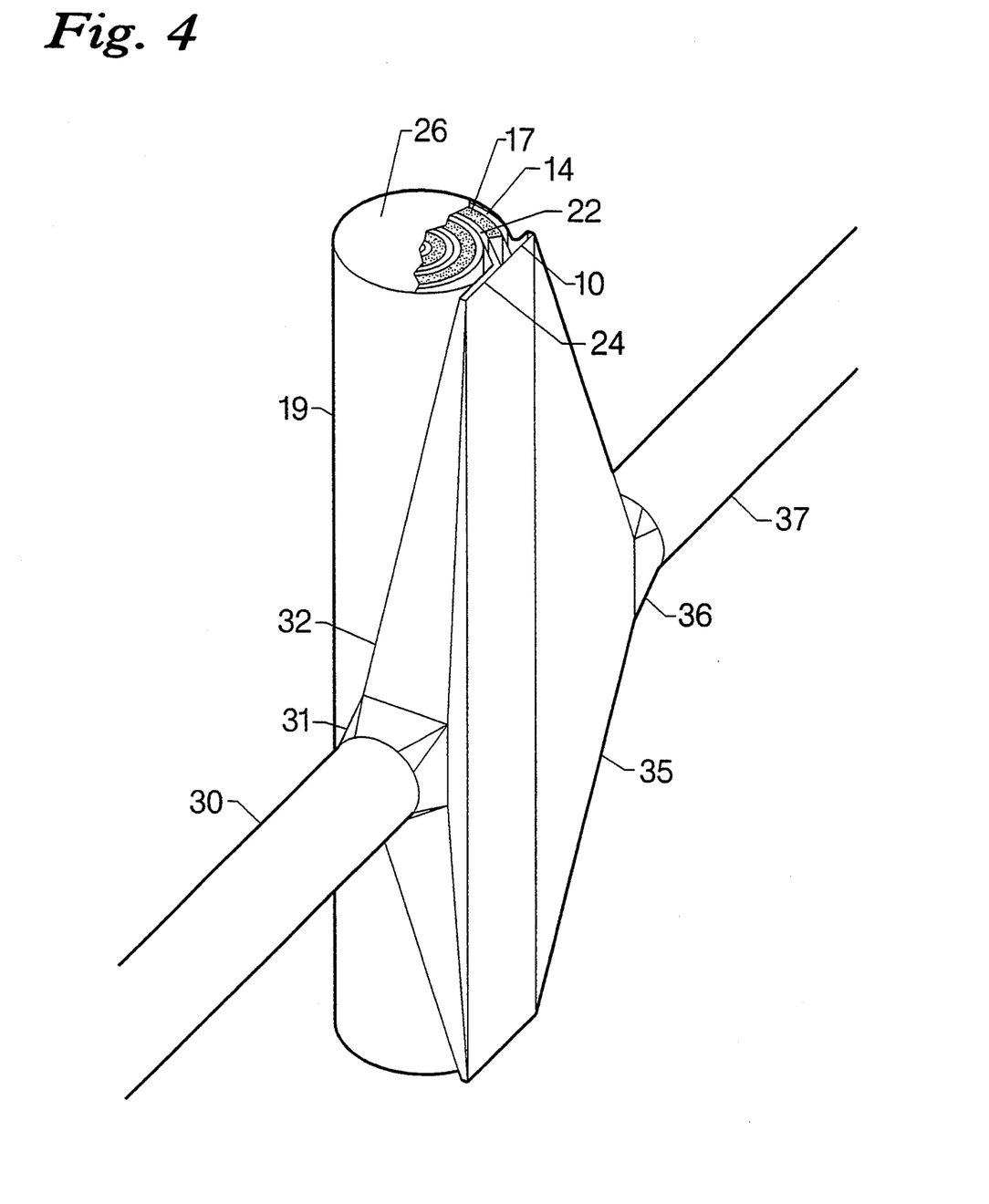
FIG. 4 is a perspective view of one embodiment of the spiral-wound adsorber with a portion of a transverse end cut away to reveal ducting details.

FIG. 4 shows the spiral-wound adsorber disposed in a cylindrical casing with one of the opposing transverse ends (26) cut away to reveal the spirally-wound adsorber bed. In addition, an inlet duct (30) is shown in fluid communication with expansion joint (31) which is in fluid communication with expansion section (32) which connects the expansion section to the inlet conduit (10). Similarly, outlet conduit (10) is an fluid communication with reduction section (35) which is fixed thereto. The reduction section 35 is in fluid communication with reducing joint (36), which is in fluid communication with outlet duct (37). If required, a blower will be disposed within the inlet duct to provide the fluid to be treated at a pressure sufficient to process the fluid in the spiral-wound adsorber module. FIG. 4 illustrates the spiral-wound adsorber in relative proportion to the gas flow in the inlet duct. For example, for about 1.67 MMNm$^3$/D (60 MMSCF/D) feedrate of fluid to be treated, the inlet duct will be about 0.5 meter (20 inches)

in diameter, and the spiral-wound adsorber, comprising about 2 and one-half turns will be approximately 1 meter (3 feet) by about 5 meters (16 feet).

The spiral-wound adsorber would typically be operated as a thermal swing adsorber (TSA) wherein the adsorbent would undergo a regeneration with steam or a stream of heated fluid such as a slip stream of treated fluid from another adsorber. The steam or heated fluid is introduced to the spiral-wound adsorber module in a regeneration mode to desorb the adsorbed impurities. The desorbed impurities may be recovered, for example, by condensation following the use of steam as a regerant, or disposed of by incineration if heated gas is employed as a regenerant. In a typical installation, two or more spiral-wound adsorber modules may be operated to provide continuous treating wherein at least one module is operating in an adsorption mode while another is operating in a regeneration mode.

The adsorbent bed contains an adsorbent selected from the group consisting of crystalline molecular sieves, activated clays, silica gels, carbon molecular sieves and the like. Such adsorbent material or mixtures thereof will be understood to be suitable if the adsorbent material is capable of selectively adsorbing impurities such as VOCs and water from a fluid stream.

As used here, the term "molecular sieve" is defined as a class of adsorptive desiccants which are highly crystalline in nature, distinct from amorphous materials such as gamma-alumina. Preferred types of molecular sieves within this class of crystalline adsorbents are aluminosilicate materials commonly known as zeolites. The term "zeolite" in general refers to a group of naturally occurring and synthetic hydrated metal aluminosilicates, many of which are crystalline in structure. There are, however, significant differences between the various synthetic and natural materials in chemical composition, crystal structure and physical properties such as x-ray powder diffraction patterns. The zeolites occur as agglomerates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

The pore size of the zeolitic molecular sieves may be varied by employing different metal cations. For example, sodium zeolite A has an apparent pore size of about 4 Å units, whereas calcium zeolite A has an apparent pore size of about 5 Å units. The term "apparent pore size" as used herein may be defined as the maximum critical dimension of the molecular sieve in question under normal conditions. The apparent pore size will always be larger than the effective pore diameter, which may be defined as the free diameter of the appropriate silicate ring in the zeolite structure.

Zeolitic molecular sieves in the calcined form may be represented by the general formula:

$Me_{2/n}O:Al_2O_3:xSiO_2:yH_2O$ where Me is a cation, x has a value from about 2 to infinity, n is the cation valence and y has a value of from about 2 to 10.

The general formula for a molecular sieve composition known commercially as type 13X is:

$1.0\pm0.2Na_2O:1.00Al_2O_3:2.5\pm0.5SiO_2$ plus water of hydration. Type 13X has a cubic crystal structure which is characterized by a three-dimensional network with mutually connected intracrystalline voids accessible through pore openings which will admit molecules with critical dimensions up to 10 Å. The void volume is 51 volume percent of the zeolite and most adsorption takes place in the crystalline voids.

Typical well-known zeolites which may be used include chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicate disclosed in U.S. Pat. No. 4,073,895, hereby incorporated by reference. Detailed descriptions of some of the above-identified zeolites may be found in D. W. Breck, *Zeolite Molecular Sieves*, John Wiley and Sons, New York, 1974, hereby incorporated by reference.

The adsorbent may be poured as a solid into the spiral shaped space defined by the inner and outer screens, or the adsorbent may be admixed with a fluid such as water and poured into the spiral space as a slurry and subsequently dried to drive off the excess water and activate the adsorbent. The adsorbent will be disposed as an adsorbent layer extending along a longitudinal axis and wrapped in a spiral. Preferably the layer of adsorbent will have a thickness ranging from about 1 cm (0.5 inch) to about 15 cm (6 inches), and most preferably the thickness of the layer will range from about 1 cm (0.5 inches) to about 8 cm (3 inches). It is important for the layer of adsorbent to be of sufficient thickness to prevent bypassing within the spiral. The layer of adsorbent may be of uniform depth throughout the spiral, or the layer of adsorbent may be tapered such that the depth of the layer is largest at the inlet and is gradually tapered as the layer spirals toward the center of the spiral, and is thinnest along the longitudinal axis.

Preferably, the adsorbent will be milled to a particle size ranging from about 100 microns (120 mesh) to about 1.6 mm (1/16 inch) and a screen size selected by those skilled in the art with an opening size sufficiently small enough to retain the adsorbent in place. The screen and the wall material may be constructed from any suitable metal such as aluminum or steel. The spacers or baffles may be made from the same material as the walls in the form of radial spaced vanes or in the form of corrugated sheets which have been slit or perforated to minimize resistance to fluid flow within the channels.

Referring back to FIG. 2, it can be understood by one skilled in the art, that at least a portion of the inner wall can be provided by a portion of the outer wall, thus simplifying the construction and reducing the cost of the spiral-wound adsorber module. This reduction in cost will also apply to the use of a cocurrent flow scheme. In the cocurrent flow scheme, the inlet conduit is fixed radially at the outer end of the adsorbent bed and the outlet conduit is fixed at the center of the spiral along the vertically extending axis. The outer end of the outlet channel is sealed, forcing all fluid in the outlet channel to flow cocurrently in the direction of the flow of the inlet fluid.

The spiral-wound adsorber module of the present invention can be operated as an adsorber bed in a temperature swing adsorption (TSA) cycle. A temperature-swing, or thermal-swing, (TSA) adsorption cycle is one in which desorption takes place at a temperature much higher than adsorption. Its major application is for separations in which contaminants are present at low concentration: i.e., purification. The TSA cycles are characterized by low residual loadings and high operating loadings. These high adsorption capacities for low concentrations mean that cycle times are long for reasonably sized beds (hours to days). A purge and/or vacuum removes the thermally-desorbed components from the bed, and cooling returns the bed to adsorption condition. In a TSA cycle, two processes occur during regeneration: heating and purging. Heating must provide adequate thermal energy to raise the adsorbate, adsorbent and adsorber temperature, desorb the adsorbate, and make up for heat losses. Heating occurs by either direct (heating elements, coils or panels inside the adsorber) or, less commonly, indirect (external heat exchange to the purge gas) contact of the adsorbent by the heating medium. Direct heating is the simpler and is invariably used for stripping-limited regeneration. The complexity of indirect heating limits its use to heating-limited regeneration where purge gas is in short supply. Coils or panels can supply indirect cooling as well. The use of steam for the regeneration of activated carbon is a combination of thermal desorption and purge displacement with direct heating supplied by water adsorption. Thermal-swing cycles have at least two steps: adsorption and heating. A cooling step is also normally used after the heating step. A portion of the feed or product stream can be utilized for heating, or an independent fluid can be used. Easily condensable contaminants may be regenerated with non-condensable gases and recovered by condensation. Water-immiscible solvents are stripped with steam, which may be condensed and separated from the solvent by decantation. Fuel and/or air may be used when the impurities are to be burned or incinerated.

The highest regeneration temperatures are the most efficient for desorption. However, heater cost, metallurgy, and the thermal stability of the adsorbent and the fluids must be considered. Silica gel requires the lowest temperatures and the lowest amount of heat of any commercial adsorbent. Activated carbons and aluminas can tolerate the highest temperatures. Although thermal-swing regeneration can be done at the same pressure as adsorption, lowering the pressure can achieve better desorption and is often used. The heating gas is normally used for the cooling step. Rather than to cool the bed, adsorption can sometimes be started on a hot bed.

The most common processing scheme is a pair of fixed-bed adsorbers alternating between the adsorption step and the regeneration steps. However, the variations possible to achieve special needs are endless. The flow directions can be varied. Single beds provide interrupted flow, but multiple beds can ensure constant flow. Beds can be configured in lead/trim, parallel trains, series cool/heat, or closed-loop.

The normal flow direction through a TSA fixed bed is usually in a vertical direction. The mechanical complexities required for horizontal- or annular-flow beds often outweigh the decrease in pressure drop achieved. In the present invention, the flow of feed and product are lateral to the adsorbent bed, providing a low pressure drop therethrough.

Although most applications of fixed bed have multiple adsorber beds to treat continuous streams, batch operation using a single adsorber bed is an alternative. For purification applications, where one vessel can contain enough adsorbent to provide treatment for days, weeks or even months, the cost savings and simplicity often justify the inconvenience of stopping adsorption treatment periodically for a short regeneration. When large flows are to be treated, designing and building a single adsorber vessel large enough to treat the entire stream is not practical. Instead, the feed flow is split equally between parallel beds and/or trains of adsorbers. This provides the additional advantage of a convenient method of turning down the process to save on utilities.

When the gas available for regeneration is in short supply, the regeneration steps are often carried out in a closed loop. This recycle of the bed effluent back to the inlet has the advantage of concentrating the impurity and making it easier to separate by condensation or other recovery means. Heating is usually accomplished with a semi-closed loop, which has a constant fresh gas makeup and a bleed to draw off the desorbed material. However, contaminant is at a higher level than in an open loop and product purity is harder to achieve.

The removal of volatile organic compounds (VOC) from air is most often accomplished by TSA. Air streams needing treatment can be found in most chemical and manufacturing plants, especially those using solvents. At concentration levels from 500 to 15,000 ppm, recovery of the VOC from steam used to thermally regenerate activated carbon adsorbent is economically justified. Concentrations above 15,000 ppm are typically in the explosive range and require the use of inert gas rather than air for regeneration. Below about 500 ppm, recovery is not economically justifiable, but environmental concerns often dictate adsorptive recovery followed by destruction. Activated carbon is the traditional adsorbent for these applications, which represent the second largest use for gas phase carbons.

The invention will be further clarified by a consideration of the following examples, which are intended to be purely exemplary of the use of the invention. These examples are based on engineering design calculations.

EXAMPLES

EXAMPLE I

A spiral-wound adsorber module for the dehumidification and removal of VOCs from the air stream of Example I to treat 16 MMNm$^3$/D (60 MMSCFD) of air is determined to require 2 modules, each approximately 0.75 m (2.5 ft) in diameter and approximately 26 m (20 ft) in length resulting in an absorbent volume of 63 cubic feet in each module. The bed thickness within the spiral-wound adsorber module is a uniform 6 cm. (2.4 inches). The adsorbent (30×40 mesh particles) is separated from the inlet and outlet channels by screens forming a total uniform space of about 2.4 inches, including the width of the screens. Each screen width is about 0.05 cm. (0.12 inches). Inlet and outlet channel widths were maintained with spacers placed at regular intervals to maintain the uniform adsorbent bed thickness and channel widths within the spiral-wound module. The air stream feed to be treated was passed through an inlet channel at right angles to the adsorbent bed from the outside of the spiral toward the center. The adsorber effluent gas comprising the treated air was collected on the outlet side of the adsorbent bed in the outlet channel and passed countercurrently to the flow of the inlet air stream feed.

EXAMPLE II

Figure 5:
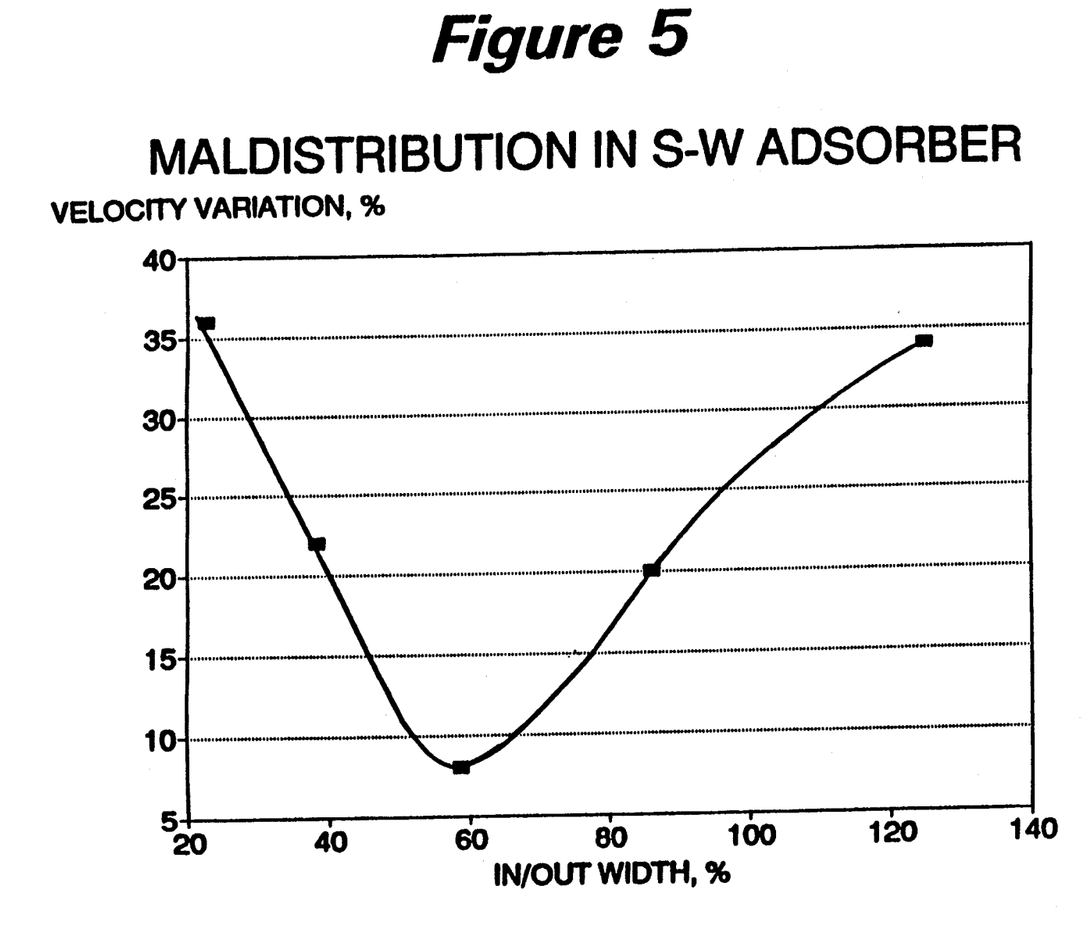
FIG. 5 is a curve showing the maldistribution of the inlet gas flow as the width of the inlet channel is varied with respect to the outlet channel width for a fixed total inlet and outlet width.

Example II is based on the spiral-wound adsorber module of Example II. By engineering simulation, it was discovered that there was an advantage to make the inlet side of the spiral-wound adsorber module smaller, or less wide than the outlet side of the module. In fact, according to the curve shown in FIG. 5, the maldistribution of the inlet gas flow approaches 30% when the inlet is small, less than 25% of the total bed inlet and outlet width and when the inlet width is about equal to the outlet width. However, the maldistribution of the gas flow is reduced to less than 10%, the inlet width ranges between 52 and 80% of the outlet width. In fact, the maldistribution appears to go through a minimum of 8% when the inlet width is 60% of the outlet width. This analysis was based on a 30×40 mesh adsorbent particle arranged in the spiral-wound module and an overall pressure drop through the adsorbent bed of about 2 psi.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim as my invention:

1. A spiral-wound adsorber apparatus comprising:
   a) a layer of adsorbent having a thickness and extending along a longitudinal axis and wrapped in a spiral about said longitudinal axis:
   b) an inlet screen and an outlet screen on opposite sides of said layer of adsorbent for retaining said adsorbent in said spiral and for supplying and withdrawing a fluid from opposite sides of said adsorbent bed through said inlet screen and said outlet screen;
   c) at least one impermeable wall wrapped between said inlet and outlet screen defining an inlet channel between an impermeable wall and said inlet screen to distribute fluid to said inlet screen and defining an outlet channel between an impermeable wall and said outlet screen to collect fluid from said outlet screen;
   d) an inlet conduit in fluid communication with said inlet channel for supplying fluid to said inlet channel;
   e) an outlet conduit in fluid communication with said outlet channel for withdrawing fluid from said outlet channel; and,
   f) means at opposite transverse ends of said layer of adsorbent for retaining said adsorbent and structurally supporting said inlet and outlet screens.

2. The apparatus of claim 1 wherein a plurality of spacers are located in said inlet and outlet channel to separate said impermeable wall from the inlet and/or outlet screen.

3. The apparatus of claim 2 wherein the spacers located in said inlet channel maintain said inlet channel at an inlet channel width and the spacers located in said outlet channel maintain said outlet channel at an outlet channel width.

4. The apparatus of claim 3 wherein the inlet channel width and the outlet channel width are uniform.

5. The apparatus of claim 4 wherein the inlet channel width is about 40 to about 80 percent of the outlet channel width.

6. The apparatus of claim 4 wherein the inlet channel width is about 60 percent of the outlet channel width.

7. The apparatus of claim 1 wherein the layer of adsorbent has a uniform thickness.

8. The apparatus of claim 1 wherein the layer of adsorbent is tapered such that said layer is thinnest at said longitudinal axis.

9. The apparatus of claim 1 wherein said adsorbent is selected from the group consisting of silica gel, alumina, activated alumina, carbon, activated carbon, molecular sieves and mixtures thereof.

10. The apparatus of claim 1 wherein a single impermeable wall is wrapped between said inlet and outlet screens and said inlet and outlet channels are formed on opposite sides of said single impermeable wall.

11. The apparatus of claim 1 wherein the thickness of said layer of adsorbent ranges from about 1 cm (0.5 inch) to about 15 cm (6 inch).

12. The apparatus of claim 11 wherein the adsorbent comprises particle sizes ranging from about 100 microns (120 mesh) to about 1.6 mm (1/16 inch).

13. The apparatus of claim 1 wherein the outside of said absorbent module is enclosed in a casing.

14. The apparatus of claim 13 wherein said casing comprises a cylinder and the ends of said cylinder provide said means for retaining and structurally supporting said layer of adsorbent.

* * * * *